United States Patent Office 3,316,530
Patented Apr. 25, 1967

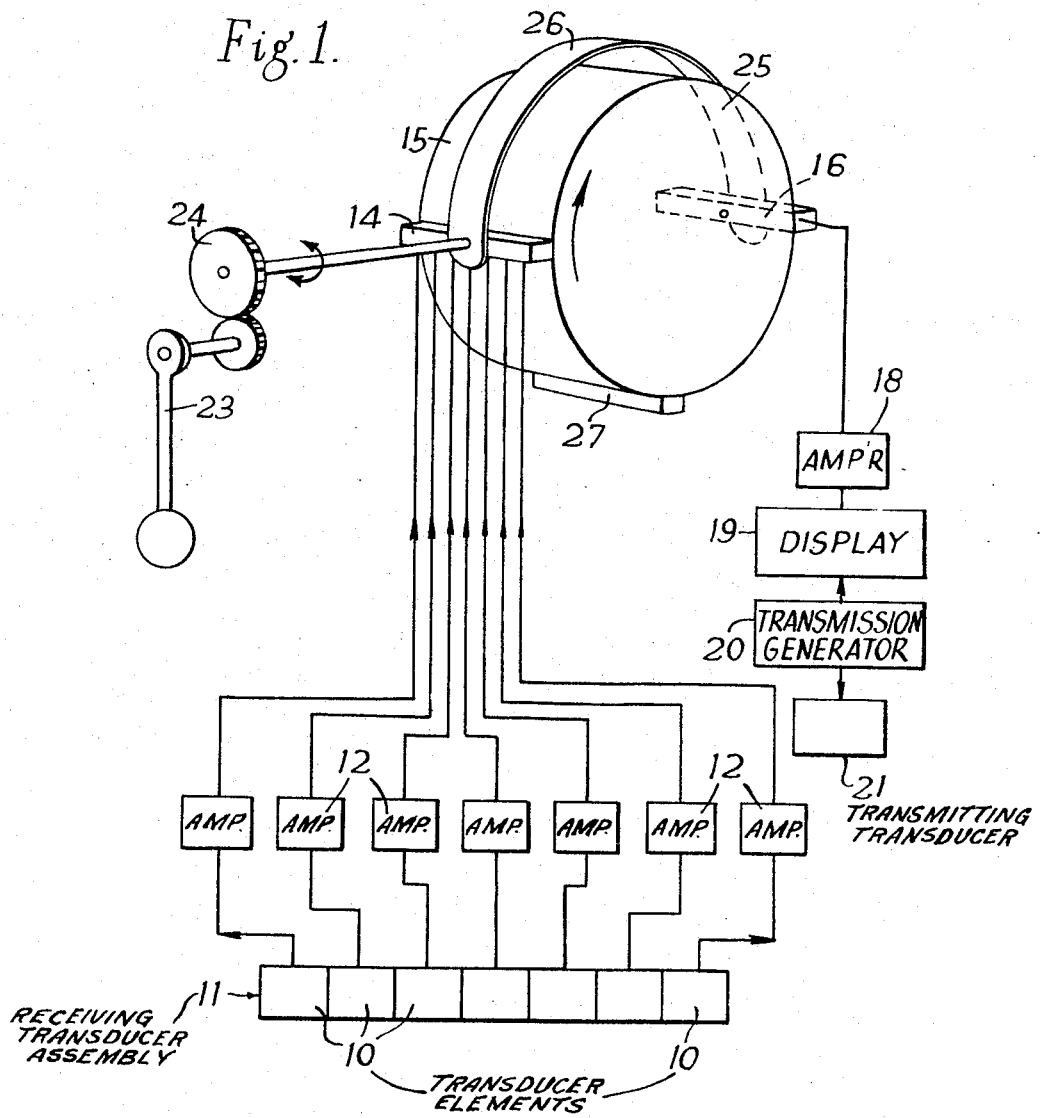

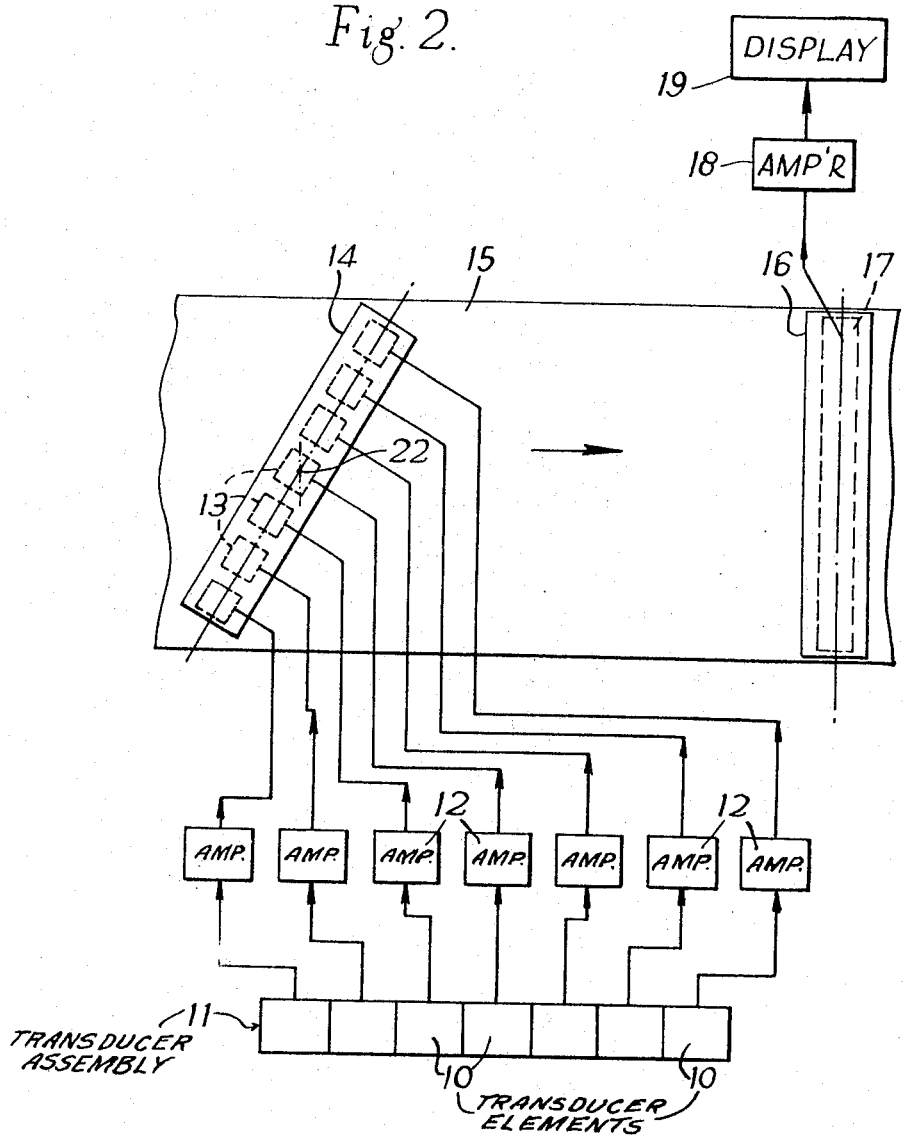

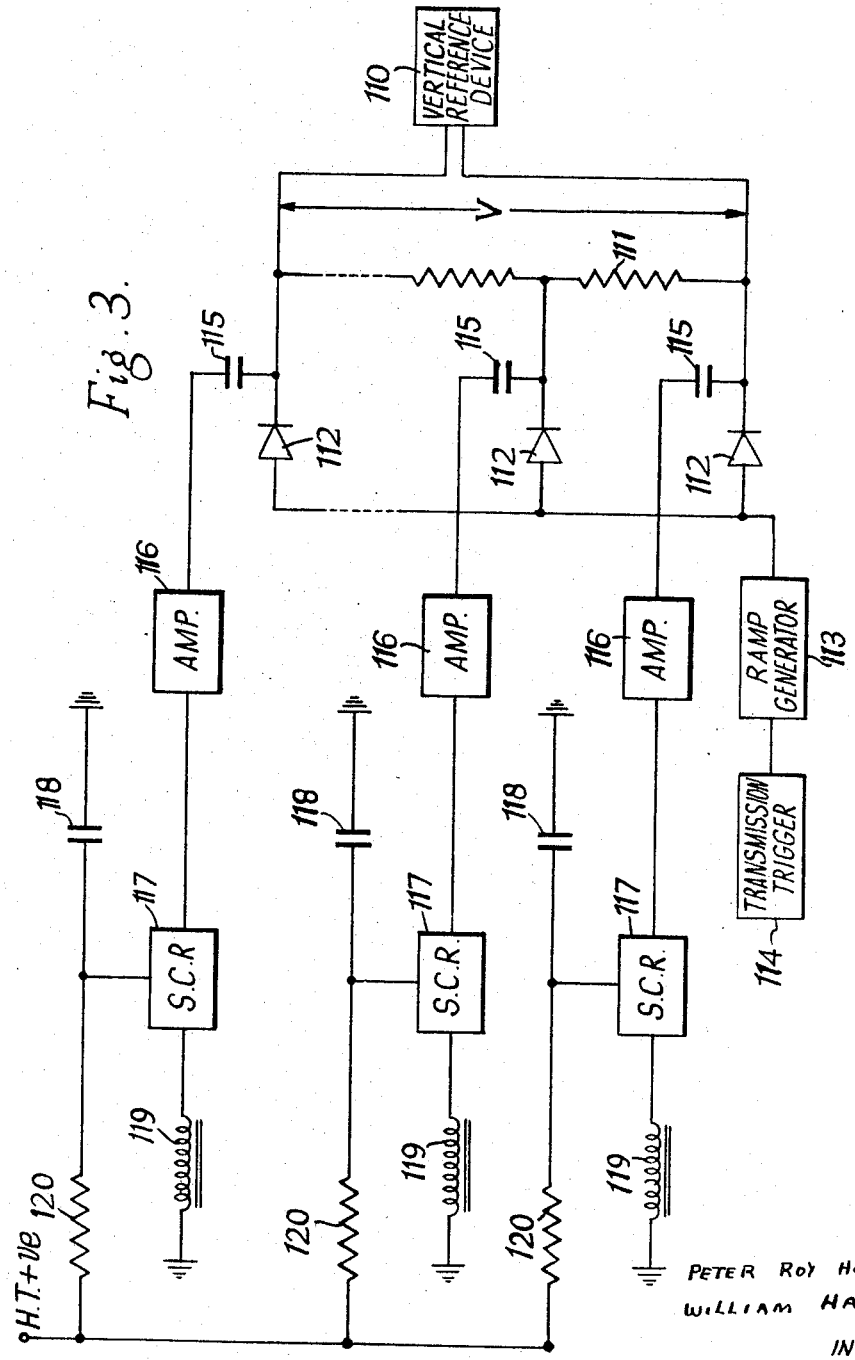

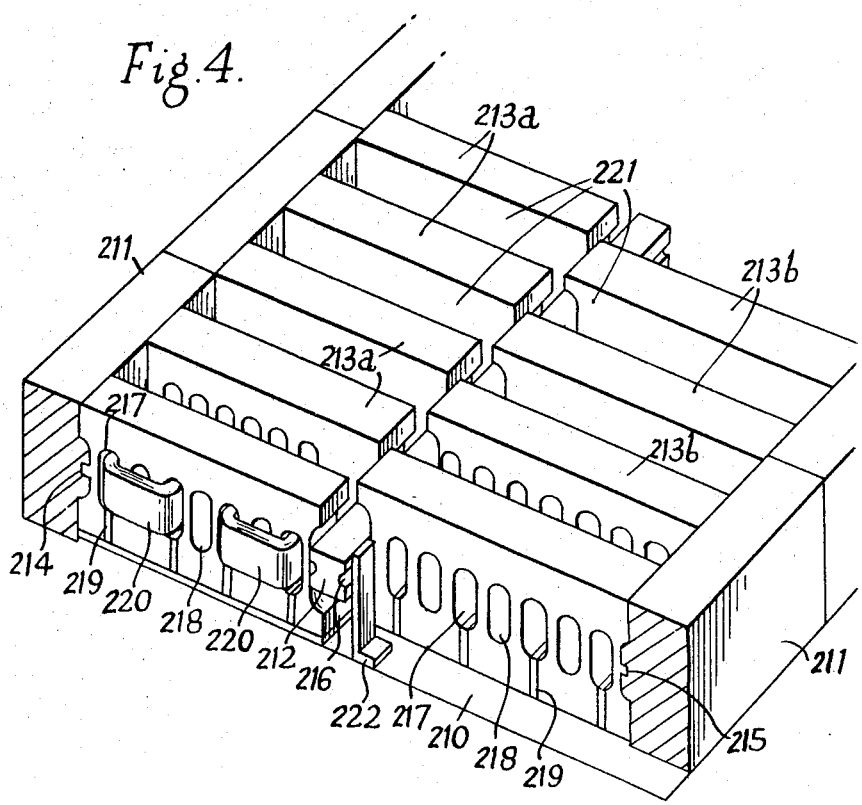

3,316,530
ECHO-SOUNDING APPARATUS WITH STABILIZED NARROW BEAM
Peter Roy Hopkin and William Halliday, London, England, assignors to S. Smith & Sons (England) Limited, London, England, a British company
Filed July 13, 1964, Ser. No. 381,982
10 Claims. (Cl. 340—3)

The present invention relates to echo-sounding apparatus. Such apparatus, which may be used for depth-sounding or for the detection of fish usually has a transducer system for the transmission and reception of pulsed pressure wave energy which operates at ultrasonic frequencies or frequencies in the higher sonic or audible range, that is to say around 10 kc./s.

To avoid the uncertainties arising from the use of a beam of wide angle which registers all objects on a spherical surface as being at the same depth it is possible to use a row of transducer elements which will give a beam narrow in the plane of the row. In this case the problem arises of isolating the beam from the rolling and pitching of the vessel on which the apparatus is carried since otherwise swinging of the beam through a range of angles will introduce uncertainties in the display comparable with those produced by a wide beam. The provision of a stable mounting for the transducer system is difficult and expensive and it has therefore been proposed to control the effective direction of the receiving beam electrically by changing the relative timing or phase of the signals generated by the several transducer elements in response to the reception of echoes.

It is an object of the present invention to provide an improved apparatus of this kind which is relatively simple and economical to manufacture and will be suitable and convenient for use in fishing vessels.

Accordingly the present invention is characterised by a vertical reference device, preferably a damped pendulum, arranged to control the relative timing or phases of pulses transmitted by the transducer elements and/or the relative timing of the echo-signals from the transducer elements in dependence upon the inclination of the row of transducer elements in a vertical plane in such a manner as to maintain a substantially constant effective direction of transmission and/or reception respectively.

In a preferred construction apparatus in accordance with the invention has a transducer system for transmission and reception of pulsed pressure wave energy the transducer system including a row of transducer elements, and a delay system controlled by a vertical reference device to maintain the direction of the beam of the row of transducer elements independent of the inclination of the row, in which the delay system is a magnetic recording system having spaced recording and replay units extending across a recording medium movable relative to the recording and replay units, one of the units having a row of heads each connected to a different transducer element, and the vertical reference device is arranged to control the relative angular positions of the units to vary the relative delays imposed on the signals associated with the several transducer elements.

The vertical reference device, which may be a damped pendulum, can thus be used to stabilize a transmitted or a receiving beam or both. The row of transducer elements controls the effective direction and the width of the beam only in the vertical plane in which the row lies. The row will normally be arranged athwartships since in the fore and aft direction the uncertainty in depth caused by a wide beam is resolved as the ship travels over the object from which an echo is being received and the range of the object reaches a minimum. However, by providing two rows of transducer elements one in the athwartships and the other in the fore and aft direction, and using one for transmission and the other for reception, the generally fan-shaped beams produced by the two rows are crossed to produce an effective beam narrow in both planes which can be maintained pointing in the required direction by control of the timing of the transmitted and received signals.

It is a further object of the invention to provide a simple and convenient means in such apparatus for steering a transmitted beam by energizing the transducers in a row sequentially.

Accordingly the invention provides echo-sounding apparatus having a row of transmitting transducers, a series of switches for effecting individual energization of the transducers, a control device for generating a steering signal representing the required deviation of the beam from a direction normal to the transducers, a voltage divider to which the steering signal is applied, a ramp voltage generator and a series of comparators connected on the one hand to individual tappings of the voltage divider and on the other hand to the ramp voltage generator, each of the series of switches being operated by a respective one of the comparators when the ramp voltage reaches a value related to the voltage applied to that comparator by the voltage divider, whereby the transducers are energized in sequence at intervals determined by the magnitude of the steering signal.

The comparators may be rectifiers which begin to conduct when the ramp voltage passes a value equal to the voltage applied to the rectifier by the voltage divider.

The control device may be a vertical reference device generating a steering signal dependent upon the angle of inclination of the row of transducers so that the direction of the transmitted beam is rendered independent of the inclination of the row.

The construction of a transducer assembly incorporating the row of transducer elements presents difficulties because of the necessity of achieving close spacing between the elements, each of which must be provided with its own electrical circuit.

In accordance with the invention there is provided an electro-mechanical transducer assembly for echo-sounding consisting of a plurality of transducer elements arranged in a row to give a narrow steerable beam, in which alternate transducer elements in the row are offset on opposite sides of a center line. This arrangement simplifies the construction and its effect on the performance of the assembly is small. In the plane of the center line the form and steering of the beam are unaffected, while in the plane at right angles the width of the beam is determined by the overall width of the assembly and is subject to a small variation because of the steering effect of energization of the elements on one side of the center line before those on the other.

Each transducer element may consist of a stack of laminations of magnetostrictive material, such as nickel, formed with slots extending through the stack in a direction parallel to the center line and individual windings for the elements wound in coils whose sides pass through the slots.

The invention will now be more fully described with the aid of examples illustrated in the accompanying drawings, in which:

FIG. 1 is a diagram of apparatus in accordance with the invention for stabilizing a receiving beam, FIG. 2 is a diagram of part of a similar apparatus showing schematically the arrangement of the recording and replay units relative to the recording medium, FIG. 3 is a circuit diagram of echo-sounding apparatus in accordance with the invention having means for steering the transmitted beam, and FIG. 4 is a perspective view of a transducer assembly, shown without the windings of all except one of the transducer elements so that the structure may be more clearly seen.

In the apparatus shown in FIGS. 1 and 2 the individual magnetostrictive transducer elements 10 of a multi-element transducer assembly 11 are connected through separate amplifiers 12 to separate recording heads 13 of a magnetic recording unit 14. The recording unit 14 is arranged to record on a recording medium 15 which travels past the recording unit 14 and a replay unit 16. The heads 13 record on separate tracks on the recording medium 15 the signals generated by the different transducer elements 10 in response to the receipt of echoes. The replay unit 16 has a single magnetic head 17 common to all the recorded tracks and thus combines the signals from the different transducer elements 10. The combined signal is applied through an amplifier 18 to a display device 19 which displays it against a time base triggered by a transmission generator 20. The transmission generator 20 controls the transmission of pulses by a transmitting transducer 21 and the triggered time base of the display device 19 thus indicates the range of the object from which an echo has been received.

When the row of transducer elements 10 forming the multi-element transducer assembly 11 is horizontal, echoes approaching it in a vertical direction reach all the transducer elements substantially simultaneously. If the recording unit 14 is parallel to the replay unit 16 the same delay will be imposed on the signals from all the transducer elements 10 and they will reach the replay unit simultaneously, resulting in a combined output signal which when applied to the display device will appear as an echo at a particular range. Since the range is vertically downwards it may be read on the display as equivalent to depth. Echoes reaching the row of transducer elements 10 from any other direction will arrive at the elements at different times and, being subjected to the same delay will reach the replay head 17 at different times. They will therefore not be combined to give an output signal of sufficient magnitude to appear in the display.

The transducer assembly 11 is mounted on the hull of a fishing vessel and will therefore be subject to movement with the rolling and pitching of the ship. If the inclination of the row in a vertical plane changes, the effective direction of reception will no longer be vertically downwards. However, by altering the relative delays imposed by the magnetic recording system this can be corrected.

As shown in FIG. 2 the recording unit 14 can be swung about an axis through its center point 22 and the result of this is that the heads 13 on one side of the center point are brought nearer the replay head 17, thus shortening the delay, while the heads 13 on the other side are carried further away, thus lengthening the delay. There is a progressive change in the delay from one head to the next which can be made to compensate for the progressive change in the time of arrival of an echo from vertically below the ship at the transducer elements 10 when the row is inclined from the horizontal. The position of the recording unit 14 is controlled by a vertical reference device which measures the angle of inclination of the row.

In the apparatus shown in FIG. 1 the vertical reference device is a damped pendulum 23 which controls the position of the recording unit 14 by a mechanical connection through a reduction gear 24. The recording medium 15 is the periphery of a continuously rotating drum 25 and the recording and replay units 14 and 16 are mounted in diametrically opposite positions. The recording and replay units 14 and 16 are connected by a yoke 26 so that they are both moved by the vertical reference device 23. In this way the angular displacement necessary for any required change of delay time is shared between the two units. This is advantageous since angular displacement of the units relative to the curved surface of the drum 25 not only puts the heads 13 or 17 at an angle to the tracks so that they do not operate at full efficiency but also moves the heads farther from the underlying part of the recording medium 15. Also the movement of both units ensures that the heads of the two units remain in alignment on a common track.

An erase head 27 is arranged to remove recorded signals from the recording medium 15 after they have passed the replay unit 16, in conventional manner.

It will be apparent from the foregoing that similar apparatus may be used for steering a transmitted beam. The pulse signal to be transmitted is recorded simultaneously on several tracks and reproduced by separate replay heads connected to the elements of a transmitting transducer. The relative delays introduced in the several tracks are controlled as before by a vertical reference device altering the angular disposition of either the recording or replay unit or both.

It is possible to use the same magnetic drum and heads for steering both the transmitted and received beams. With the drum rotating at a constant speed in one direction and the position of the heads controlled by the vertical reference device it is necessary to reverse the order in which the transducer elements are connected between the separate heads between the time when the transmission pulses are replayed by the heads and applied to the transducer elements and the time of reception of the first echo signal by the transducer elements and its recording by the same heads. This is necessary because the track length between the common head, when acting as recording head, and the separate heads, acting as replay heads, in the direction of travel of the drum periphery is complementary to the track length between the separate heads, when acting as recording heads, and the common head, acting as replay head. This switching can be effected electrically without difficulty.

When the magnetic delay device is used for steering the received beam it may also serve to delay fish echo signals relative to the bottom echo signal for the purpose of producing a display locked to the bottom echo, as described in our British Patent No. 785,001.

The single common head 17 may be replaced by a number of separate heads for the different tracks which, when the head 17 is a replay head as shown, have their outputs combined electrically or which, when used as a recording unit for steering a transmitted beam, are fed with the same input signal.

In the case illustrated in FIG. 2, in which only the recording unit is moved, the delays produced are proportional to the sine of the angle between the recording and replay units. If this angle is equal to the angle of inclination of the row of transducer elements the delays produced are in exactly the required relation. As stated above, it is preferred to move both the recording and replay units and in this case the theoretical delay values are not achieved but a sufficiently close approximation can be obtained.

In the apparatus shown in FIG. 3 a vertical reference device 110, which may be a damped pendulum, generates a voltage V which is proportional to the sine of the heel angle, that is to say the angle by which the vessel on which the apparatus is mounted deviates from the vertical. Since the row of transducers is so mounted as to be horizontal when the vessel is vertical the voltage V is proportional to the sine of the angle of inclination of the row. The voltage V is applied to a potentiometer resistor 111. The negative poles of a number of unidirectional conducting devices or rectifiers 112 are connected to individual tap along the length of the potentiometer 111. The positive poles are all connected to a saw-tooth voltage generator 113 which is triggered by a transmission trigger 114. The transmission trigger may be of conventional construction and may, for example, be a circuit generating pulses at fixed intervals or a set of contacts closed at intervals by the operation of a recording device for recording the echo-signals.

When the saw-tooth generator 113 is triggered by the transmission trigger 114 it generates a saw-tooth voltage increasing linearly with time which is applied to the positive poles of the rectifiers 112. The voltages applied to the negative poles of the rectifiers 112 differ in steps and are successively increasing fractions of the voltage V. Thus as the saw-tooth voltage increases it reaches the voltage applied to the other pole of each of the rectifiers in turn and the rectifiers 112 therefore begin to conduct at intervals determined by the magnitude of the voltage V. The commencement of current in each of the rectifiers 112 is caused to energize a corresponding transducer of the row and the relative timing of the transmitted pulses from the transducers of the row and therefore the direction of the transmitted beam, is thus controlled by the magnitude of the voltage V. When the angle of inclination of the row is zero the voltage V is zero and the transducers are energized simultaneously. As the angle increases in either direction V also increases and the timing of the transmitted pulses is altered to maintain a constant direction for the beam. This direction will normally be vertically downwards but it is obvious that the direction could be altered by applying a bias voltage in addition to the voltage V dependent upon the inclination.

The junction of each rectifier 112 and the corresponding tap of the potentiometer 111 is coupled by a coupling capacitor 115 and an amplifier 116 to a silicon controlled rectifier 117 which acts as a switch. Upon the passage of current through the rectifier the saw-tooth voltage is applied to the coupling capacitor 115 and a pulse is applied to the rectifier 117 through the amplifier 116 to open the switch. The opening of the switch allows a capacitor 118 to discharge through the winding 119 of the corresponding magnetostrictive transducer to generate a pulse of pressure wave energy which is transmitted into the sea. The capacitors 118 are charged through resistors 120 connected to a common H.T. supply line.

In the apparatus described the vertical reference device 110 was employed to render the direction of the beam independent of the movements of the vessel and the resultant changing inclination of the row of transducers. It will be obvious that alternatively, or in addition, the direction of the beam could be changed by applying a suitable voltage across the potentiometer resistor 111 to control the timing of the energization of the transducers. For example, the beam could be repeatedly swept through a range of angles by means of a periodically varying voltage in order to examine a larger region.

Other modifications are possible. The rectifiers may be poled in the opposite sense and the ramp voltage may decrease with time instead of increasing. Alternatively the rectifiers may be replaced by other forms of comparator device, for example a device which operates its associated switch only when the sum of the ramp voltage and the applied fraction of the steering voltage exceeds a given value, that is to say one which compares the ramp voltage with the difference between the applied fraction of the steering voltage and the given value.

In the transducer assembly shown in FIG. 4, a base plate 210 carries along opposite edges end blocks 211. A bar 212 is supported midway between the rows of end blocks 211.

Nine magnetostrictive transducer assemblies 213a composed of stacks of nickel laminations are mounted between the bar 212 and the end blocks 211 on one side of the bar 212. Nine identical magnetostrictive transducer assemblies 213b are mounted on the opposite side of the bar 212, which thus lies on the center line of the assembly, between the end blocks 211. Each of the transducer elements 213a and 213b consists of laminations which have projections 214 at their ends which engage in grooves 215 in the end blocks 211 and grooves 216 in the bar 212. The transducer elements are thus supported at the mid-point of their height.

The laminations have openings which form slots 217 and 218 extending through the stack from one face to the other in a direction generally parallel to the bar 212. The slots 217 serve to accommodate the energizing windings of the transducer whereas the slots 218 which alternate with the slots 217 are left empty. Each of the slots 217 has a narrow extension from one side in which is disposed a biassing magnet 219. Coils 220 are wound in the slots 217 and are connected in series to form an energizing winding for the transducer element.

The disposition of the elongate transducer elements 213a and 213b side-by-side and alternately on opposite sides of the bar 212 leaves spaces 221 between the elements on one side of the bar opposite the elements on the other side. These spaces 221 serve to accommodate the ends of the coils 220 wound in the slots of the transducer elements. They also accommodate support brackets 222 which carry the bar 212 and are disposed at intervals along the bar and alternately on the two sides of the bar.

This multi-element transducer assembly can be used as a transmitter or a receiver. Its construction enables the elements to be so positioned that the separation between them does not exceed half a wavelength for the frequencies commonly used in echo-sounding.

We claim:

1. Echo-sounding apparatus having a transducer system for transmission and reception of pulsed pressure wave energy, said transducer system including a multiplicity of magnetostrictive transducer elements, each said element consisting of a stack of elongate rectangular laminations which have slots therethrough and which are stacked face to face with the slots of the laminations aligned with one another through the stack, means mounting the said elements in a row with the slots extending lengthwise of the row, said mounting means including means positioning alternate transducer elements of the row offset from one another across the row, a multiplicity of electrical windings inductively coupled to said elements respectively with each winding wound to extend through the slots of its respective element, a vertical reference device providing an output signal representing the inclination of the row in a vertical plane, and signal control means coupled to the row of transducer elements and connected to receive the output signal of the vertical reference device, said signal control means modifying the temporal relationship of the said electrical signals in accordance with the said output signal to maintain the direction of the beam of the row of transducer elements independent of the inclination of the row.

2. Apparatus as claimed in claim 1 in which said signal control means includes a delay system comprising a magnetic recording system having a recording medium, spaced recording and replay units extending across said recording medium, said recording medium being movable relative to the recording and replay units, one of the units having a row of heads each connected to a different transducer element, and the vertical reference device is arranged to control the relative angular positions of the units to vary the relative delays imposed on the signals associated with the several transducer elements.

3. Echo-sounding apparatus having a row of transmitting transducers, a series of switches for effecting individual energization of the transducers, a control device for generating a steering signal representing the required deviation of the beam from a direction normal to the transducers, a voltage divider to which the steering signal is applied, a saw-tooth voltage generator and a series of comparators connected on the one hand to individual tappings of the voltage divider and on the other hand to the saw-tooth voltage generator, each of the series of switches being operated by a respective one of the comparators when the saw-tooth voltage reaches a value related to the voltage applied to that comparator by the voltage divider, whereby the transducers are energized in sequence at intervals determined by the magnitude of the steering signal.

4. Apparatus as claimed in claim 3 in which the comparators are rectifiers which begin to conduct when the saw-tooth voltage passes a value equal to the voltage applied to the rectifier by the voltage divider.

5. Apparatus as claimed in claim 4 including a plurality of coupling means each of which is associated with an individual one of said switches for coupling the switch to the junction of the corresponding rectifier and its tapping on the voltage divider whereby a switching pulse is applied to the switch when the rectifier begins to conduct, each said coupling means including an individual capacitor and an individual amplifier connected serially from the respective rectifier to the respective switch.

6. Apparatus as claimed in claim 3 in which the control device is a vertical reference device generating a steering signal dependent upon the angle of inclination of the row of transducers so that the direction of the transmitted beam is rendered independent of the inclination of the row.

7. Apparatus as claimed in claim 3 in which the switches are silicon controlled rectifiers.

8. Apparatus as claimed in claim 3 including a plurality of capacitors, and in which the transducers are magnetostrictive transducers each having an electrical winding, and the switches each serve to discharge an individual one of said capacitors through the winding of the corresponding transducer.

9. Apparatus as claimed in claim 3 wherein the transducer elements are megnetostrictive transducer elements and alternate transducer elements in the row are offset on opposite sides of a center line.

10. Apparatus as claimed in claim 8 including an electrical supply line common to all said capacitors, and a plurality of resistors coupling the capacitors respectively to the common supply line.

References Cited by the Examiner
UNITED STATES PATENTS

| | | | |
|---|---|---|---|
| 2,411,518 | 11/1946 | Busignies | 343—102 |
| 2,421,263 | 5/1947 | Herbst | 340—11 |
| 2,768,364 | 10/1956 | Camp | 340—9 |
| 2,825,043 | 2/1958 | Abbott | 340—6 X |
| 3,113,286 | 12/1963 | Miller et al. | 340—6 |
| 3,144,631 | 8/1964 | Lustig et al. | 340—3 |
| 3,178,679 | 4/1965 | Wilkinson | 340—3 |

CHESTER L. JUSTUS, *Primary Examiner.*

R. A. FARLEY, *Assistant Examiner.*